Figure 1:
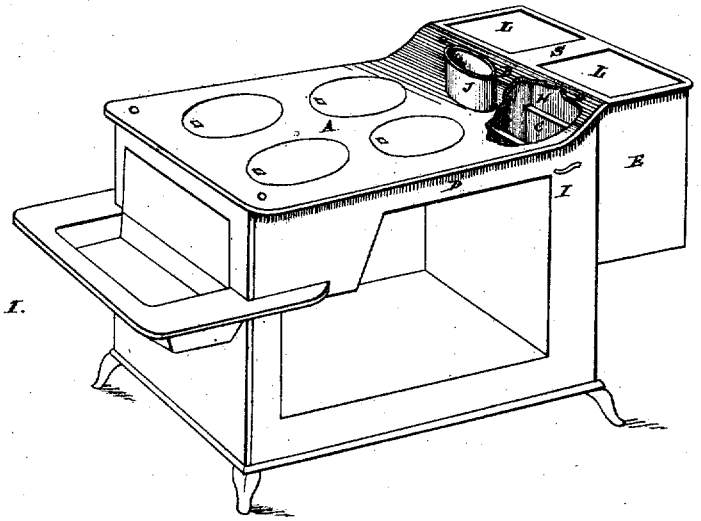

G. H. PHILLIPS.

Cooking-Stoves.

No. 5,583. Reissued September 30, 1873.

Witnesses.
Robt. H. McMillan
George Scott

Inventor
Geo. H. Phillips

A.M. PHOTO-LITHOGRAPHIC Co. N.Y. (OSBORNE'S PROCESS)

UNITED STATES PATENT OFFICE.

GEORGE H. PHILLIPS, OF TROY, NEW YORK.

IMPROVEMENT IN COOKING-STOVES.

Specification forming part of Letters Patent No. 83,790, dated November 3, 1868; reissue No. 4,063, dated July 5, 1870; reissue No. 5,583, dated September 30, 1873; application filed May 15, 1873.

*To all whom it may concern:*

Be it known that I, GEORGE H. PHILLIPS, of Troy, in the county of Rensselaer and State of New York, have invented and made certain Improvements in Cooking-Stoves, and in the attachment and combination of water-reservoirs thereto, for and upon which Letters Patent of the United States were duly granted and issued to me, bearing date November 3, 1868, and numbered 83,790; and which Letters Patent were surrendered by me, in accordance with the law in such cases made and provided, and were reissued to me on the 5th day of July, 1870, and numbered 4,063, upon amended specifications; and which last-named Letters Patent I have again in this application surrendered to the Commissioner of Patents for the purpose of procuring another reissue upon amended specifications, that the invention contained in said patent may be more fully described and set forth; and, therefore, I declare the following to be a full, clear, and exact description of said invention and improvements, reference being had to the accompanying drawings forming a part of these amended specifications.

The nature of my invention relates to a manner and means, by construction and arrangement of parts, for locating a water-reservoir upon the back part of a cooking-stove, and partly above the boiler-hole top of such stove, and so arranged that the heated products of combustion, after having filled other uses in the stove, shall come in contact with such reservoir and heat the same. My invention and improvement consists in so constructing a cooking-stove at its back part or end as to form hot-air spaces or space, or chambers or chamber, above the horizontal plane of the boiler-hole top of such stove by attaching to the back end plate of such stove a water-reservoir, the top of which is raised above the horizontal plane of the boiler-hole top of such stove and parallel therewith, and by uniting the boiler-hole top with the reservoir-top by means of an extended and inclined plate or molding, and by extending upward the rear vertical descending and ascending flues. The jambs of the stove may extend upward to close the ends of such heating chambers or space. The back vertical end plate of said stove extends from the stove-bottom up to and terminates on a line with the boiler-hole top, so as to leave that portion of the water-reservoir which is above said back plate exposed to the direct action of the heated gases or products of combustion in said hot-air chambers or spaces, so as to more readily heat said reservoir and its contents. My invention also consists of a manner of dividing the space so inclosed against the front part of the reservoir by the upward extension into the inclosure of the dividing flue-strips. It further consists of a manner of forming and locating the pipe-collar with reference to heating the reservoir, by constructing the said collar upon the inclined plate or molding, and at its base where it joins the curved connecting-plate that it will follow the same line of curve, having one side low down upon the molding, and near where it joins the boiler-hole top, and the other side higher upon the molding, and near where it unites with the reservoir-top. Thus the pipe-collar will communicate with the chamber or inclosed space upon an inclined opening, and its lower and longest side at the front will induce the escaping products of combustion on the way to the exit-pipe against that part of the reservoir-front to which it is opposite.

In the accompanying drawings, like letters represent like parts in all the figures.

Figure 2:
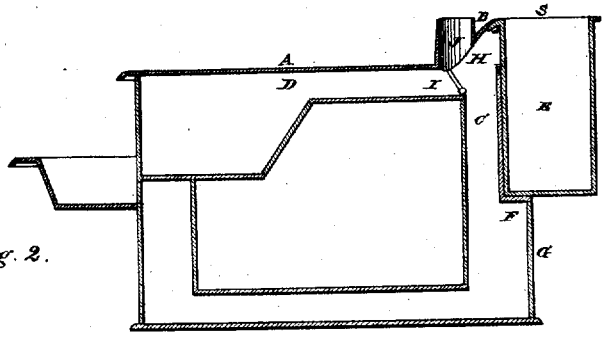

Figure 1 is a perspective view of a cooking-stove with my improvements therein shown. Fig. 2 is a longitudinal vertical sectional view of the same stove; and Fig. 3 is a perspective, showing a back view of the same with the reservoir removed therefrom.

The stove is made in the usual manner of cooking-stoves, except the rear part, which is hereinafter described. The oven is of the usual construction in its several parts. The jambs D at the rear top corner project upward to cover the side of the extended flue or space, as shown in Fig. 3. The rear end plate is made to extend from the bottom plate of the stove up to, and terminates at, a horizontal line with the boiler-hole top A, as shown in Fig. 2. This plate is somewhat curved from side to side below the reservoir E, and is marked G. The upper portion C is straight, and forms an offset at F for the reservoir to rest upon. The reservoir E rests against and is partly above the rear end plate C, and is attached to the rear end of such stove, and extends upward above a horizontal plane with the boiler-hole top A, as shown in Fig. 2. The boiler-hole top A is connected and attached to the reservoir-top S by an inclined plate or molding, as at B, Figs. 1 and 2, which forms the top of the hot-air chambers or spaces, as shown at H, Figs. 2 and 3. The rear vertical descending and ascending flues are extended upward above the boiler-hole top, as shown at H, Fig. 2, and by the combination of the inclined plate or molding B, the front of the reservoir E, and jambs D is formed the hot-air chamber or space, which is for the purpose of more effectually heating the water-reservoir and its contents. The front part of the reservoir E, which is above the top edge of the rear vertical end plate C, forms the back side of the hot-air chambers or spaces, above the horizontal line of the boiler-hole top, as shown in Figs. 2 and 3. It will be readily seen that the heated gases or products of combustion come in direct contact with that part of the reservoir which is above the top edge of the back end plate C, as shown in Fig. 2, and that heat will be supplied from below and retained in said chambers or spaces to great advantage. The flue division-strips are extended upward to the top of said hot-air chambers or space, thereby dividing such chamber or space into separate apartments, as shown at H H H, Fig. 3.

Figure 3:
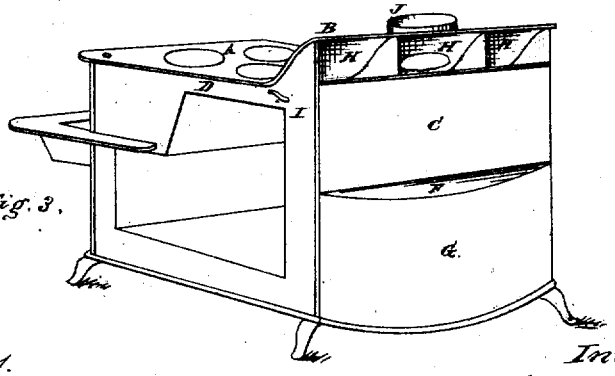

There is a damper, I, in front of the ascending flue, for the purpose of a downward or direct draft, which may be opened or closed at pleasure, the handle of which is seen on Figs. 1 and 3. The pipe-collar J is placed low down upon the inclined plate or molding, as shown in Figs. 1 and 3, so as to leave a space above and behind it in the chamber or hot-air space, so as to more effectually heat the reservoir and contents.

The connecting-plate B, which unites the boiler-hole top A and the reservoir-top S, should be so formed that the hot-air chamber or chambers or space is retained above the horizontal plane of the boiler-hole top and in front of the upper portion of the reservoir.

Fig. 1 shows a portion of the connecting-plate B cut away, so as to show the hot-air chamber or space H; also, the top edge of the back end plate C and that part of the reservoir-front which is above the top edge of the back end plate C.

The stove is held firmly together with rods and bolts, in the usual way.

The plate that connects the boiler-hole top and the reservoir-top may be fastened together in any desirable way.

Having thus described my invention and a manner of construction, what I desire to secure by Letters Patent is—

1. The boiler-hole top-plate of a cooking-stove connected with the top of a reservoir, which is against and partly above the rear vertical end plate of the stove, (the top edge of said vertical end plate being on a line with the boiler-hole plate A extended rearward,) by means of an inclined plate or molding which joins the boiler-hole top-plate at a point over and above the descending and ascending flues of the stove, and therefrom extending upward, outward, and backward, until it unites with the reservoir-top, substantially as herein described and set forth.

2. The combination of a water-reservoir at the back of a cook-stove, against and partly above the upper edge of the rear vertical end plate C, which plate extends from the stove-bottom up to and terminates at a line of the boiler-hole top extended rearward, with a chamber or chambers formed, in part, by the front of that part of the reservoir which is above the upper edge of said rear end plate, and an inclined plate or molding which connects the boiler-hole top of the stove with the top of the reservoir by its upward, outward, and backward extension, substantially as and for the purposes hereinbefore described and set forth.

3. The descending and ascending vertical flues extended upward within the rear end of a cooking-stove, such extension being above the horizontal plane of the top plate A, and also above the upper edge of the rear vertical end plate C, and covered over at the upper ends or parts by means of a connecting-plate or molding, B, substantially as and for the purposes hereinbefore described and set forth.

4. The division flue-strips extending upward into the space formed, in part, by the front of a reservoir, which is against and partly above the upper edge of the rear vertical end plate C, and by an inclined or connecting plate, B, joining the boiler-hole top with the top of the reservoir, to partition off the space so inclosed, and shown in Fig. 3, substantially as hereinbefore described.

5. The pipe-collar for the exit-pipe upon the inclined plate or molding B, which connects the boiler-hole top with the top of the reservoir S, and arranged substantially as shown, so that, where it joins the inclined plate, it shall follow the same line therewith, and open into the space inclosed against the front wall of said reservoir upon an angle, and, between its higher and lower points of union with the molding or connecting-plate, shall inclose the escaping heat against the exposed part of the reservoir-front, which is above the upper edge of the rear plate C, or above the horizontal line of the boiler-hole top A, substantially as and for the purposes hereinbefore described and set forth.

6. A cooking-stove having a water-reservoir attached to the rear end of such stove, and a part of such reservoir raised above the horizontal plane of the boiler-hole top A, the reservoir-top and the boiler-hole top connected together at and above the ordinary rear descending and ascending flue, flues, or space, and inclosing a space or spaces, as hot-air chamber or chambers, between the front of said reservoir and the aforesaid connecting-plate or molding, and above the horizontal plane of the boiler-hole top of said stove, substantially as and for the purposes hereinbefore described and set forth.

G. H. PHILLIPS.

Witnesses:
ROBT. H. MCCLELLAN,
GEORGE SCOTT.